Dec. 24, 1935.   W. J. DOUGHERTY   2,025,097
TEMPERATURE CONTROL APPARATUS
Original Filed May 18, 1931   2 Sheets-Sheet 1
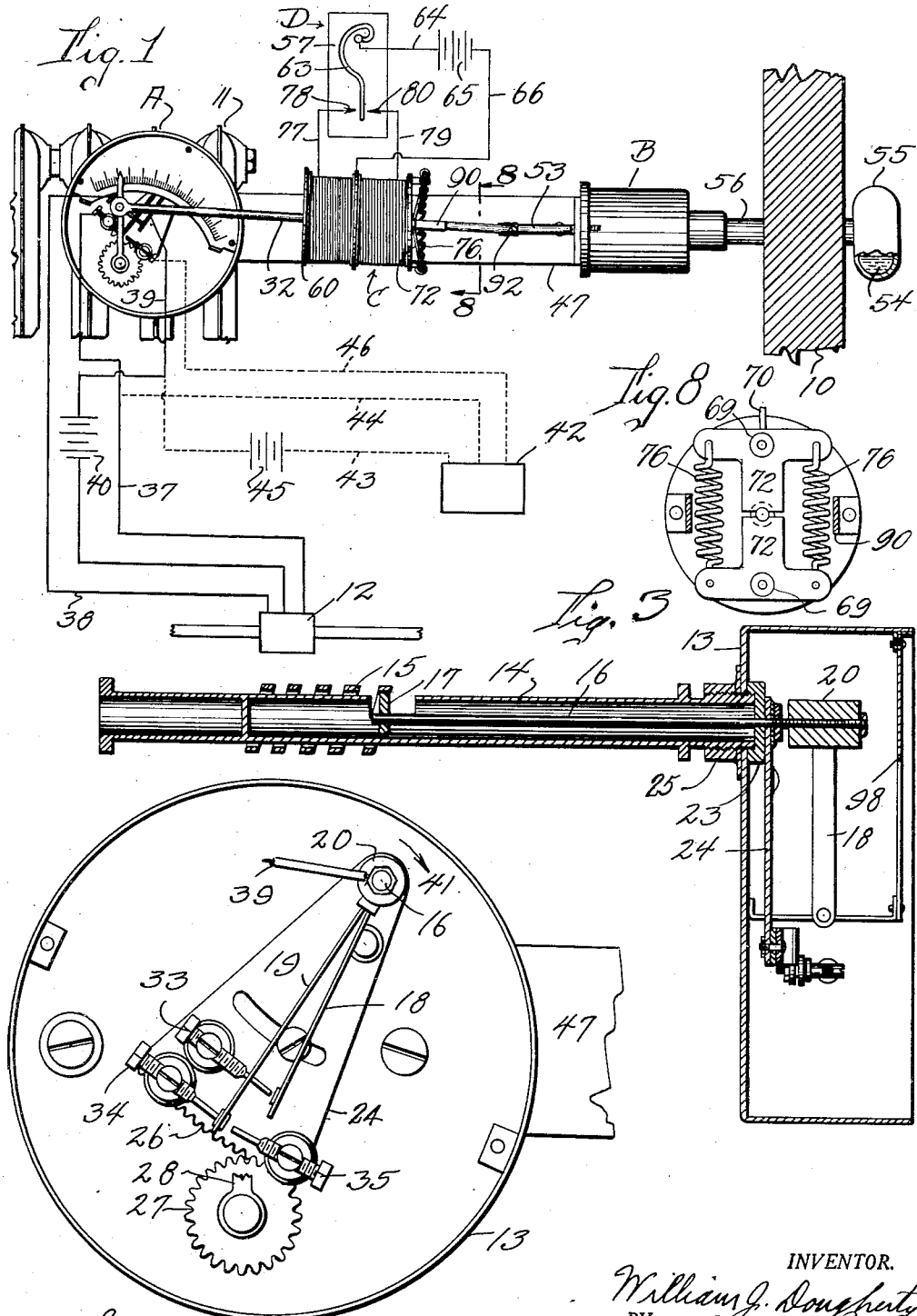
INVENTOR.
William J. Dougherty
BY
ATTORNEY.

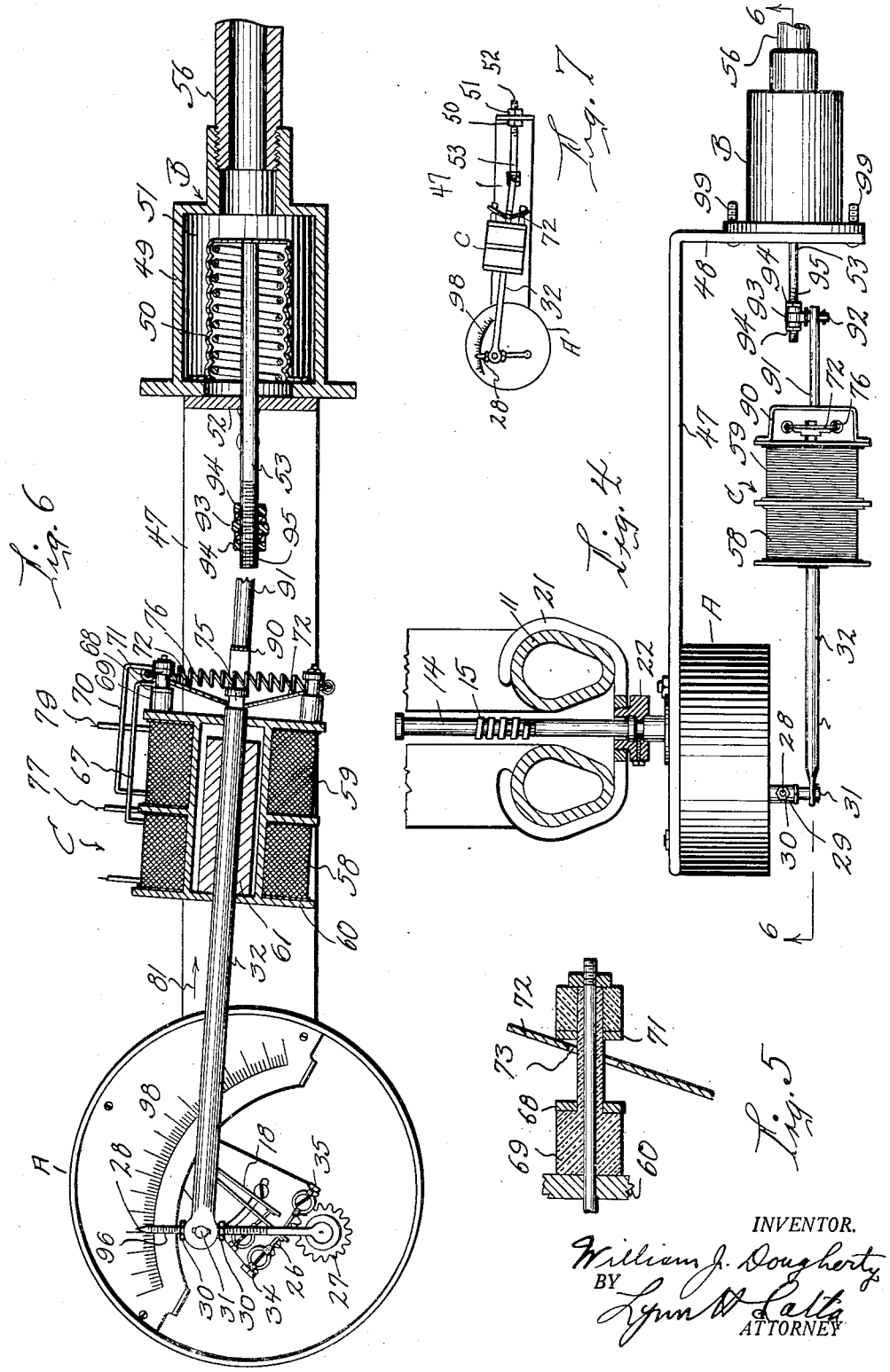

Patented Dec. 24, 1935

2,025,097

UNITED STATES PATENT OFFICE 2,025,097

TEMPERATURE CONTROL APPARATUS

William J. Dougherty, Sioux City, Iowa, assignor to Minneapolis-Honeywell Regulator Company, Minneapolis, Minn., a corporation of Delaware Application May 18, 1931, Serial No. 538,083
Renewed March 16, 1934

14 Claims. (Cl. 236—91)

My invention relates to the controlling of temperature in artificially heated spaces, particularly in dwelling houses and in office buildings where it is desirable to obtain a very nice and exact control over the heating plant which furnishes heat for said spaces.

One of the peculiar problems that has been met with in temperature control is that which is commonly designated as "cold 70". This condition arises where the heating system is controlled wholly by a thermostat acted upon by room temperatures and occurs in the period during which the heating medium is inactive. For instance, where temperature is controlled wholly by a room temperature thermostat, the heat will be shut off thereby after the high level has been reached and within a certain length of time thereafter, the circulation of warmed air within the room being heated will die down due to the cooling off of the radiator in the case of a steam or hot-water heating plant or to the dying down of the air current issuing from the registers in the case of a hot air heating plant. This is a psychological effect which may be explained as follows; the body of a person in the room becomes accustomed to the circulation of warm air from the heating radiator or register, and when this circulation dies down, a sensation of cold is produced although the actual temperature within the room may be exactly the same as it was during the time that the circulation was occurring.

One step in coping with this problem of "cold 70" has been that of incorporating a thermostat in the heating system itself, the thermostat being preferably located in close association with the heating medium. For instance, in the case of a steam radiator system, the thermostat would be incorporated in the radiator in the room to be controlled or in the steam pipe leading to the radiator, or in the heating plant itself, and in the case of a hot air heating system, the thermostat would be incorporated in the hot air duct, or furnace. The thermostat would then be set to react to maximum and minimum temperatures both within the range of the temperatures produced during the active radiation of heat into the space to be heated. By using this type of control, it is possible to produce a constant radiation of heat from the heating medium and to eliminate "cold 70".

This type of control has created a new problem in temperature control, arising from the fact that the thermostat does not react directly to room temperatures, and from the further fact that there are factors in addition to the amount of heat radiated from the heating medium which control the average temperature within a heated space. To be more explicit, the temperature and weather conditions outside of the building being heated exercise a certain amount of influence upon the temperature within the building and as these are variable factors, there is a consequent variation in the effect upon the temperature inside of the building which must be compensated for by means other than the heating medium control.

Efforts have been made to overcome this problem in the provision of a device responsive to changes in external temperature. This later step in the art has been an improvement, and yet it still has not solved the problem of accurate control, for the reason that it has been found so far to be impossible to obtain a device responsive to the external weather in such a way as to compensate for all of the various types of influence exerted by climatic changes on the exterior.

The external control ordinarily used embodies a fluid filled expansible chamber, the fluid of which is exposed to the external atmosphere. As an example of the partial failure of the external control device, the effect of the external atmosphere on such a control device will be the same at any given actual temperature of the exterior atmosphere no matter what may be the velocity of the outside air, while on the other hand the influence upon the atmosphere within the building will vary with wind changes, not only in velocity but also in direction, at any given exterior temperature, owing to the fact that more of the outside atmosphere will seep into the building under higher wind pressures than where there is less movement of the outside air.

Thus if the outside atmosphere is colder than the room temperature, the cooling effect of the outside atmosphere will increase with an increase in wind velocity.

Another influence of the outside climate which cannot be accurately compensated for by the external control alone is that of the sun. For instance, if the rays of the sun strike the external control device directly, the fluid will respond to a higher temperature than the actual temperature of the outside atmosphere and yet the effect of the outside atmosphere on the interior temperature of the building will be affected very little by the presence or absence of sunshine without, assuming the exterior temperature to be the same in either case.

The present invention has as its object to secure the successful co-ordination of heating medium control, external temperature control, and room temperature control or of heating medium control and room temperature control in such a was as to eliminate "cold 70" and to retain a very stable and constant equilibrium in room temperature.

Briefly, this object is attained by employing a heating medium thermostat for directly controlling the heating system, modifying the action of the heating medium thermostat by the external temperature responsive device, and superimposing upon the control jointly exercised by the first two mentioned controls, the controlling action of a room temperature thermostat, or by superimposing the action of the room temperature thermostat upon that of the heating medium thermostat. This system differs from prior attempts at refinement of temperature control in that the room temperature thermostat does not exercise any direct control over the heating system but is used merely to modify the joint action of the heating medium thermostat and the external temperature responsive device, or the action of the heating medium thermostat.

With these and other objects in view, my invention consists in the construction, arrangement and combination of the various parts of my device whereby the objects contemplated are attained, as hereinafter more fully set forth, pointed out in my claims, and illustrated in the accompanying drawings, in which:

Figure 1 is a diagrammatical view of a control apparatus, parts being shown in section to better illustrate the construction, Figure 2 is a view of the heating medium thermostat switch with the cover and upper parts thereof removed to better illustrate the construction, Figure 3 is a sectional view through the heating medium thermostat, Figure 4 is a plan view of the control unit, a portion of the radiator and the attaching mechanism for the control unit being shown in section to better illustrate the construction, Figure 5 is a detail, sectional view through a portion of the solenoid switch, Figure 6 is a sectional view on the line 6—6 of Figure 4, and Figure 7 is a view of a modified form of the device.

Fig. 8 is a detail sectional view on the line 8—8 of Fig. 1.

General description of the invention

I have used the reference character 10 in Figure 1 to indicate roughly the wall of a building to be heated. In the interior of the building is located a heat radiator 11, the type illustrated being of the ordinary type although it will be understood that the radiator illustrated is symbolical of any part of a heat transfer system but more particularly the mains, ducts or pipes for carrying a heating fluid from a heating plant to the region to be heated.

In these specifications, the term "heating plant" is used to indicate the heat source, as for instance, a furnace or boiler, while the term "heating system" is used to include the entire heat exchange apparatus including the heating plant, the carrying ducts and the radiators or registers. The term "heating medium" is used to indicate the fluid which serves as a vehicle for carrying the heat, such as steam, hot air, or hot water.

12 and 42 indicate alternative types of heating plant controlling devices, such as fuel valves for fluid heating systems, (as gas heaters or oil heaters), or dampers or draft controls for coal or hard fuel heaters. It will be understood that conventional types of heating plant control devices are to be employed.

The control apparatus includes a primary control, directly acting upon the valve 12 or 42, and a secondary control, modifying the action of the primary control, but not directly active upon the valve 12 or 42.

The primary control is constituted in the thermostat switch A, responsive to changes in temperature in the heating medium.

The secondary control includes as an essential element, a room temperature thermostat D, so connected to the primary control as to change its setting under the effect of changes in room temperature. In one phase of the invention, the thermostat D modifies the primary control without assistance from an external temperature responsive device.

In another phase of the invention, an external temperature responsive control B operates in conjunction with the room temperature control D to modify the action of the primary control A.

Detailed description of the apparatus

The switch A includes a switch casing 13, a thermostat tube 14, a bi-metal coil 15, secured at one end to the tube 14, a switch shaft 16, a disc 17 connecting the switch shaft to the other end of the coil 15, and a pair of switch arms 18, 19 secured by means of a hub 20 to the end of the shaft 16.

The tube 14 extends through a bracket 21 and is secured thereto by a nut 22, the bracket 21 being adapted to be secured in any suitable manner to a portion of the heating system such as the radiator 11. The tube 14 may be secured as by means of a nut 23 to the casing 13, and a contact sector 24 is secured between the nut 23 and the nut 25 threaded onto the shaft 16.

The sector 24 has gear teeth 26 which mesh with a pinion 27 journalled in the casing 13 and attached to a combined setting and indicator lever 28.

A boss 29 is secured to the lever 28 as by means of nuts 30 and is provided with a pin 31 on which is pivoted one end of the armature shaft 32.

An adjustable switch point 33 is carried by the sector 24 and contacts with the switch lever 18, extending through an opening (not shown) in the switch arm 19, but not contacting therewith.

Adjustable switch points 34 and 35 carried by the sector 24 are positioned to contact either side of the switch lever 19. The switch point 34 is connected by means of a wire 37 to the valve 12, the switch point 33 is connected to the valve 12 by means of a wire 38, and the levers 18, 19 are connected by means of a wire 39 to a source of current 40 and then to the valve 12.

The type of valve indicated at 12 is rather commonly known in the art. It is sufficient to say that the valve 12 will be opened only when both switch points 33 and 34 are in contact with their respective levers 18, 19. Movement of the levers 18, and 19 is controlled by twisting movement of the thermostat shaft 16, the levers moving toward valve opening position when the shaft moves in the direction of the arrow 41, and toward valve closing position when the shaft rotates in the opposite direction. The type of valve here under consideration is one wherein only the opening of the valve is electrically energized.

The foregoing discussion of an existing type of thermostat switch is given merely to clarify the functioning of the arrangement of which said switch forms a part.

The switch employed in this invention differs from the old type of switch in the addition of the switch point 35 which is employed in connection with a somewhat different type of control valve 42 shown in dotted lines in Figure 1. In using this type of valve, (a low voltage type), a valve opening circuit includes the wires 43 and 44 and the source of current 45, while a valve closing circuit includes the wires 43 and 46 and the source of current 45.

Secured to the casing 13 is a bracket 47 provided at one end with an arm 48 bent at right angles to the main bracket portion. The external temperature responsive device B includes a casing 49, housing an expansible chamber 50, which is so mounted therein that a sealed off space 51 is provided between the exterior of the chamber and the interior of the casing 49, while the interior of the chamber communicates with an opening 52 in the casing 49 through which extends a shaft 53 secured at its end to that end of the chamber which is remote from the connection between the chamber and the casing 49.

Pressure is exerted against the chamber 50 by a fluid 54 which fills the space 51, an externally located bulb 55, and a pipe 56 connecting the bulb 55 and the casing 49.

The casing 49 is secured as at 99 (Figure 4) to the arm 48, and the shaft 53 is connected to the shaft 32 through the medium of the solenoid unit C which is controlled by a room temperature responsive thermostat D shown in Figure 1.

The solenoid unit C includes the coils 58 and 59, mounted in a unitary casing 60 through which slides the shaft 32, the latter being provided with an armature 61 which is somewhat shorter than the core space within the casing 60 so as to allow a limited range of movement longitudinally of the shaft 32. This range of movement is determined by contact of the armature 61 at its ends with the end walls of the casing 60, the armature 61 being secured rigidly upon the shaft 32.

The connection between the shaft 53 and the solenoid unit C includes a yoke 90 secured to the casing 60, an arm 91 secured to the yoke 90, a pivot pin 92 pivotally mounted in the arm 91, and formed with the ring 93 which receives the end of the shaft 53 and is secured thereto by means of adjustable nuts 94 threaded onto the threaded end 95 of the shaft 53.

By adjusting the nuts 94, the connection between the bulb 50 and arm 28 can be shortened or lengthened as desired, thus changing the setting of the arm 28 and the switch points 33, 34 relative to the bulb 50. The pivotal connection of the pin 92 and arm 91 provides for the slight amount of swinging movement necessary in the shaft 32 in order to allow the arm 28 to swing in an arcuate path.

The arm 28 is threaded as at 96, allowing the connection between the pin 31 and the arm to be adjusted toward or from the pivotal axis of the arm. By adjusting the pivotal connection between the arm and shaft toward the pinion 27, the amount of movement given to the arm 28 by a given amount of movement in the arm 32 will be increased, while by adjusting the pivotal connection away from the pinion 27, the relative amount of movement of the arm 28 is decreased.

The switch arm 63 of the thermostat 57 is connected by a wire 64 to a source of current 65 which in turn is connected to a wire 66 which is electrically connected to the casing 60.

One side of the coil 58 is connected by a wire 67 (see Figures 5 and 6) to a switch point 68 mounted on an insulating post 69 secured to the casing 60, while one side of the coil 59 is connected in a similar manner by a wire 70 to a switch point 71 mounted on the post 69 and opposed to the switch point 68.

A toggle switch arm 72 is provided with an opening 73 receiving the post 69 and is mounted for movement to contact with either of the switch contacts 68 or 71. The other end of the toggle arm is engaged in an annular slot 75, in the armature shaft 32 and a spring 76 is mounted so as to swing the outer end of the toggle arm in a direction opposite to the direction of movement of the shaft 32 in response to movement of said shaft.

The foregoing description of the solenoid unit is given for the purpose of identifying the type of solenoid used and of describing the connection and arrangement between the room temperature thermostat and the other two controls. The description above is abbreviated in view of the fact that the specific construction of the solenoid unit 30 is conventional and known in the art. I wish to be understood as claiming the solenoid unit therefor only in combination with the other portions of my apparatus to produce the desired result.

Proceeding further with the description of the solenoid, it will be noted that the other side of the coil 58 is connected by a wire 77 to a switch point 78 of the room temperature thermostat while the other side of the other coil 59 is connected by means of a wire 79 to the other switch point 80 of the room temperature thermostat.

*Operation*

Proceeding now to the description of the operation of the apparatus, the immediate effect of room temperature changes will be first considered. Assuming that the room temperature has fallen below a certain predetermined level, at which the thermostat 57 is set to make contact with the switch point 80, a circuit will be established through the source of current 65, the thermostat switch arm 63, the contact 80, the wire 79, the coil 59, the wire 70, the contact 71, the toggle switch arm 72, the shaft 32, the solenoid casing 60, and the wire 66. The solenoid coil 59 will then be energized, causing the armature 61 and shaft 32 to be pulled in the direction of the arrow 81. As the toggle arm passes center, the spring 76 will snap the arm to a position in contact with the switch point 68, breaking the circuit which has just been made, and resetting the circuit arrangement so that when the room temperature thermostat 57 closes on the contact 78, a circuit will be established through the other solenoid coil to again reverse the position of the armature and toggle switch arm.

The effect on the entire apparatus of the first described reversal is to shorten the connection between the expansible chamber 50 and the indicator arm 28, pulling the arm 28 to the right, rotating the pinion 27, and causing the sector 24 to be moved slightly so as to move the switch points 33, 34 into closer engagement with the switch arms 18, 19.

The effect of the second described reversal is just the opposite, serving to move the switch points 33, 34 farther away from the arms 18, 19.

Turning now to the external temperature responsive control, the effect of an increase in temperature of the fluid 54 is to increase pressure against the expansible chamber 50, causing the arm 28 to be moved in a direction to adjust the points 33, 34 farther away from the arms 18, 19, while a reduction in temperature in the fluid 54 will cause it to contract allowing the bulb 50 to expand and moving the contact points 33, 34 closer to the arms 18, 19.

In the operation of the apparatus in connection with a heating system, it will be assumed for the purpose of illustration that the valve 12 is a feed valve controlling the flow of gas to a gas fuel heating plant. The valve 12 is such that the closing of the circuit including wires 38 and 39, switch point 33, and arm 18, while the circuit including wires 37 and 39, switch point 34 and arm 19 is already closed, will open the valve 12.

When the valve is open, heat will flow through the heating system until a maximum temperature has been reached in the heating system. If the thermostat A is attached to the radiator, as shown in the drawings, the upper limit on an excessively cold day may be approximately 200°. When the thermostat A is subjected to this temperature, it will have moved the arm 18 away from the switch point 33, breaking the circuit including the two contact members and allowing the valve to close.

The apparatus will ordinarily be set so that a drop in temperature of 10° below the maximum point will be required to again close the circuits controlling the opening of the valve.

In view of the fact that the lower limit will be just approximately 10° below the upper limit, the radiator will never be allowed to become cold, or the hot air ducts, as the case may be, will never be allowed to cease conveying heated air to the room to be heated.

This advantage, inherent in the heating medium type of control, eliminates what has before been referred to as "cold 70".

But while the heating medium thermostat has the advantage of eliminating "cold 70", it is subject to the objection already noted hereinbefore, namely that it can exercise no control over those factors entering into the room temperature which are variable, i. e., the factors of external weather influences.

The function of the external temperature responsive control and of the room temperature control is to correct the action of the primary control to compensate for these factors without interfering in any way with this function of eliminating "cold 70", which is achieved by locating the primary control to be acted upon by the heating medium.

For instance, assuming that the apparatus has been set to govern the room temperature under certain conditions, and that these conditions have been subsequently changed so that temperature out-of-doors has dropped, if the heating medium thermostat were to continue operating without any adjustment in its setting, the temperature in the room would gradually be lowered owing to the increased radiation of heat from the building without a corresponding increase in the amount of heat supplied from the heating plant, and the primary control would thus be ineffective in maintaining the proper level, although continuing to regulate the production of heat with a minimum of fluctuation. The device would simply be operating at a lower room temperature, being insensitive to the effect of the increased radiation from the building.

But in the present case, with the lowering of external temperature, causing the increase in radiation from the building, there would be an attendant contraction of the fluid 54 causing the arm 28 to be pulled in a direction to move the contact points 33, 34 closer to the arms 18, 19, thus causing the circuit to be made earlier in the swing of the arms 18, 19 and advancing the opening of the valve 12 relative to the position of the heating medium thermostat, i. e., causing the thermostat to close the circuit at a higher temperature of the heating medium. The limits at which the thermostat A opens and closes the circuit are indicated on the scale 98 by the pointer arm 28.

Where other factors which are beyond the control of the external temperature responsive element come into play, the setting of the primary control will be further modified by the room temperature control, which is the ultimate control of the entire apparatus. For instance, if the wind velocity should increase to such an extent as to materially lower the temperature within the building beyond that which would otherwise occur by radiation at the same external temperature, the consequent lowering in room temperature would close one side of the room temperature thermostat causing the solenoid to throw the shaft 32 to an opposite position and thus changing the setting of the switch point 33 and arm 18 to bring them closer together as has already been described in detail. The correction thus made would bring the room temperature back up to the proper level owing to the increased operation of the heating plant produced by raising the lower limit of closing of the primary control.

The modifying action of the external control and the room temperature control is further modified by a change in the pivotal connection between the armature shaft 32 and the pointer 28. For instance, assuming that a reversal of the solenoid would cause the pointer 28 to be shifted to change the setting of the switch 10° when the pivotal connection is as shown in Figure 6, an adjustment of the pivotal connection closer to the pinion 27 would result in an increase in the amount of change in setting of the pointer 28 caused by a reversal of the solenoid, and the change in setting would then be more than 10°.

The effect of the external temperature responsive control in changing the setting of the pointer 28 would correspondingly be magnified or reduced by shifting the pivotal connection 31 closer to or farther away from the pinion 27, as the case may be.

The amount of correction by the room temperature thermostat and solenoid which is required in a given installation may be adjusted by adjusting the pivot 31. When the proper adjustment has been reached, it will be found that the room temperature can be kept very accurately at a predetermined level.

It will be understood that a shift of 10° in the setting of the primary control A will ordinarily cause a corresponding change in the room temperature of approximately 10°. This will be understood when it is considered that the temperature of the radiator or other heat outlet of the heating system must be kept at a much higher level than the desired room temperature in order that all of the volume of air within the room may be continuously heated to the desired temperature to offset the loss by radiation and convection.

As the spread between the temperature of the heating system and the room temperature decreases with warmer weather and increases with colder weather, due to decreased radiation in warmer weather and increased radiation in colder weather, so the amount of change in the primary control setting caused by the external temperature responsive control will proportionately vary. Thus no adjustment of the pivot 31 is required for the purpose of meeting the changes in spread between room temperature and heating medium temperature. The sole function of the adjustment of the pivot 31 is to set the instrument during installation for the particular conditions found in the building to be heated.

It will now be seen that after the apparatus has once been adjusted to a particular heating system, that it will continue to function during all seasons and all types of weather without further adjustment. This is one of the primary advantages of the present invention.

The most important advantage of my invention however resides in the co-ordination of heating medium control, room temperature control, and external temperature responsive control, in such a manner that the three controls may function together accurately.

*Modified design*

Where it is desired to eliminate the external, automatic control, the rod 53 instead of being connected to the expansible chamber 50 is provided with a threaded adjustable connection with the supporting bracket 47 such as the nuts 150 and 151 threaded onto the threaded end 152 of the rod 53 and engaging the bracket arm 48.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In combination with a control valve of a heating plant of a heating system for living quarters, a thermostatic electric switch of the type including an adjustable switch point carrying member and an adjusting lever for giving adjustment to said member, an arm pivoted to said lever and anchored at a distance therefrom, an electric circuit including said valve and the switch whereby the valve is directly controlled by the switch, an electrically operated device having a connection with said arm and adapted to change the length thereof, and a room temperature thermostat controlling said electrically operated device but not directly controlling upon said valve.

2. In combination with a control valve of a heating plant of a heating system, a thermostatic electric switch of the type including an adjustable switch point carrying member and an adjusting lever for giving adjustment to said member, an electric circuit including said valve and the switch whereby the valve is directly controlled by the switch, a two-way solenoid, an armature shaft co-acting therewith and pivoted to said lever, and a room temperature theremostat controlling said solenoid.

3. In combination with a control valve for a heating plant of a heating system, a heat sensitive electric switch exposed to the temperature of said system and of the type including an adjustable switch point carrying member and a lever operatively connected therewith, an electrical circuit including said switch and the valve whereby the latter is directly controlled from the switch, a two-way solenoid, an armature shaft operatively associated therewith, an adjustable connection between the armature shaft and said lever whereby movement imparted to the lever by said armature shaft may be varied, and a room temperature thermostat controlling said solenoid.

4. In combination with a control valve for a heating plant of a heating system, a primary heat sensitive adjustable control device exposed to the temperature of said system and directly controlling upon said valve, an externally located fluid containing element, an expansible motor device connected with said element, a mechanical connection between said motor device and said primary control for varying the setting thereof, and a room temperature thermostat exercising a control over the length of said mechanical connection.

5. In combination with a control valve for a heating plant of a heating system, an adjustable heat sensitive electrical switch exercising a direct control over said valve, a control device responsive to external temperature changes, a mechanical connection between said control device and the switch whereby external temperature changes will cause changes in the adjustment of the switch, and a room temperature thermostat controlling the length of said mechanical connection.

6. In combination with a control valve for a heating plant of a heating system, an adjustable primary heat sensitive control device exposed to the temperature of said system and directly controlling upon said valve, a secondary control device responsive to external temperature changes, a mechanical connection between said secondary and primary control devices whereby external temperature changes will cause changes in the adjustment of said primary control device, and a room temperature thermostat controlling the length of said mechanical connection.

7. In combination with a control valve for a heating plant of a heating system for living quarters, a primary control comprising an adjustable thermostatic switch exposed to the temperature of the heating system, a secondary control device sensitive to the external temperature changes and operative to vary the switch adjustment so as to exert a modifying control upon said primary control but not a direct control upon the valve, and a room temperature sensitive control device exerting a further modifying control upon said switch adjustment and thereby upon said primary control device but exerting no direct control upon the valve.

8. The combination with a heater for heating a fluid medium by which the temperature of a space is varied, of an electrically operated control for varying the operation of said heater, adjustable switching mechanism responsive to the heat content of said fluid medium, connections between said switching mechanism and control, electrical means associated with said mechanism for changing the adjustment thereof to respond to a higher heat content of said fluid medium when said electrical means is energized, a space temperature responsive switch which closes upon a lowering in the space temperature to a predetermined value, and circuit connections for said electrical means controlled by said space temperature responsive switch.

9. In combination, a heater for heating a space, an electrically operated control device in control of said heater, adjustable switching mechanism responsive to a heater condition, electrical connections for said eletrically operated control device controlled by said switching mechanism, electromagnetic means associated with said switching mechanism for changing the adjustment thereof, and space temperature responsive switching means in control of said electromagnetic means.

10. The combination with a heater and an electrically operated device for controlling the operation thereof, of adjustable switching mechanism responsive to a heater condition in control of said electrically operated device, a thermostat responsive to the temperature of a space to be heated, a thermostat responsive to outdoor temperatures, and connections between said thermostats and switching mechanism by which said thermostats change the adjustment of said switching mechanism in accordance with changes in outdor and space temperatures.

11. The combination with a heater and an electrically operated device for controlling the operation of the heater, of switching mechanism responsive to a heater condition in control of said device, means for adjusting said switching mechanism, an outdoor temperature responsive thermostat, connections between said thermostat and adjusting means by which said outdoor thermostat gradually varies the adjustment of said switching mechanism in response to changes in outdoor temperature, a space temperature responsive thermostat, means only movable to one or the other of two definite positions controlled by said space temperature responsive thermostat, and connections between said last-named means and adjusting means.

12. In combination, a heater for heating a space, a device for controlling said heater, switching means responsive to a heater condition, connections between said switching means and device for operating the same to maintain said heater condition within predetermined limits, a space temperature responsive switching mechanism including a pair of switches one of which is moved to a new circuit controlling position when the space temperature falls to a predetermined minimum and the other of which is moved to a new circuit controlling position when the space temperature rises to a predetermined maximum, electrically operated means movable to one or the other of two definite positions under the control of said two space temperature responsive switches, means for adjusting said heater condition responsive switching mechanism, and connections between said adjusting means and electrically operable means.

13. In combination with a control valve of a heating plant of a heating system, a thermostatic electric switch of the type including an adjustable switch point carrying member and an adjusting lever for giving adjustment to said member, an electric circuit including said valve and said switch whereby said valve is directly controlled by said switch, a solenoid, an armature shaft coacting therewith and pivoted to said lever, and a room temperature thermostat controlling said solenoid.

14. In a heating system control device, heat supply means, a thermal switch controlled by the temperature of the heat supply, means for initiating heat generation as a result of switch closure and having movable adjusting means, a thermal element exposed to temperatures other than the heat supply means, and electrical means controlled by the last mentioned element and controlling said movable adjusting means to delay switch closure as the temperature of the last mentioned element rises, and to accelerate switch closure as that temperature falls.

WILLIAM J. DOUGHERTY.